United States Patent
Theiler et al.

(10) Patent No.: US 7,953,280 B2
(45) Date of Patent: May 31, 2011

(54) ANOMALOUS CHANGE DETECTION IN IMAGERY

(75) Inventors: James P. Theiler, Los Alamos, NM (US); Simon J. Perkins, Santa Fe, NM (US)

(73) Assignee: Los Alamos National Security LLC, Los Alamos, NM (US)

( * ) Notice: Subject to any disclaimer, the term of this patent is extended or adjusted under 35 U.S.C. 154(b) by 900 days.

(21) Appl. No.: 11/871,714

(22) Filed: Oct. 12, 2007

(65) Prior Publication Data

US 2008/0310735 A1 Dec. 18, 2008

Related U.S. Application Data

(60) Provisional application No. 60/944,437, filed on Jun. 15, 2007.

(51) Int. Cl.
*G06K 9/46* (2006.01)
*H04N 5/14* (2006.01)

(52) U.S. Cl. ........................................ 382/201; 348/700

(58) Field of Classification Search .................. 382/159, 382/181, 195, 201, 209, 218, 282; 348/700, 348/E5.067
See application file for complete search history.

(56) References Cited

U.S. PATENT DOCUMENTS

| | | | |
|---|---|---|---|
| 6,754,374 B1 | 6/2004 | Miller et al. | |
| 6,958,466 B1 | 10/2005 | Stein | |
| 6,985,623 B2 * | 1/2006 | Prakash et al. | ................ 382/173 |
| 7,009,644 B1 * | 3/2006 | Sanchez et al. | ............... 348/247 |
| 2001/0022814 A1 | 9/2001 | Kimura | |
| 2005/0196045 A1 | 9/2005 | Zoghlami et al. | |

OTHER PUBLICATIONS

C. Clifton. Change detection in overhead imagery using neural networks. International Journal of Applied Intelligence, vol. 18., No. 2, pp. 215-234 (2003).
A Schaum et al. Estimating hyperspectral target signature evolution with a background chromodynamics model. Proc. International Symposium on Spectral Sensing Research (ISSSR) (2003).
J. Theiler et al. Resampling approach for anomalous change detection. Proc. SPIE 6565, 65651U (2007).
J. Theiler et al. Proposed framework for anomalous change detection. Proc. ICML Workshop on Machine Learning Algorithms for Surveillance and Event Detection (Jun. 29, 2006, Pittsburgh, Pa.), pp. 7-14. Retrieved from <http://web.archive.org/web/20060901081102/web.engr.oregonstate.edu/~wong.workshops/icml2006/papers/theiler.pdf> Sections 1, 2, 2.1, 2.1.2, 3.

* cited by examiner

*Primary Examiner* — Daniel G Mariam
(74) *Attorney, Agent, or Firm* — John P. O'Banion

(57) ABSTRACT

A distribution-based anomaly detection platform is described that identifies a non-flat background that is specified in terms of the distribution of the data. A resampling approach is also disclosed employing scrambled resampling of the original data with one class specified by the data and the other by the explicit distribution, and solving using binary classification.

25 Claims, 16 Drawing Sheets

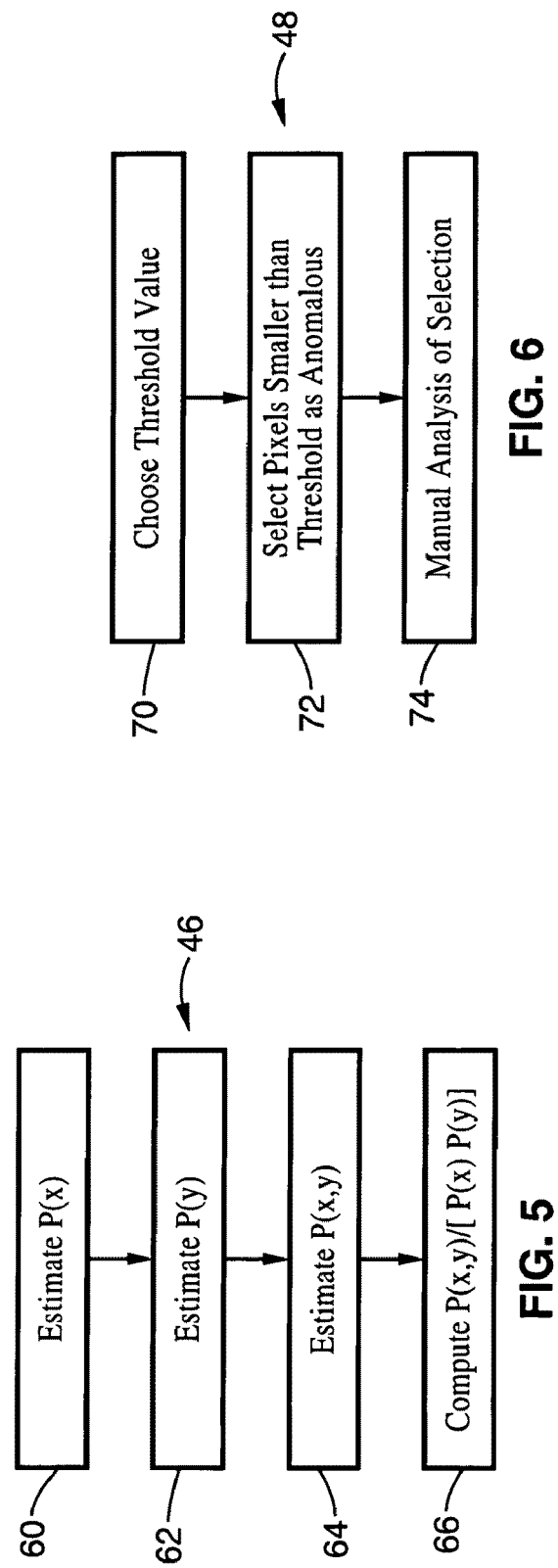

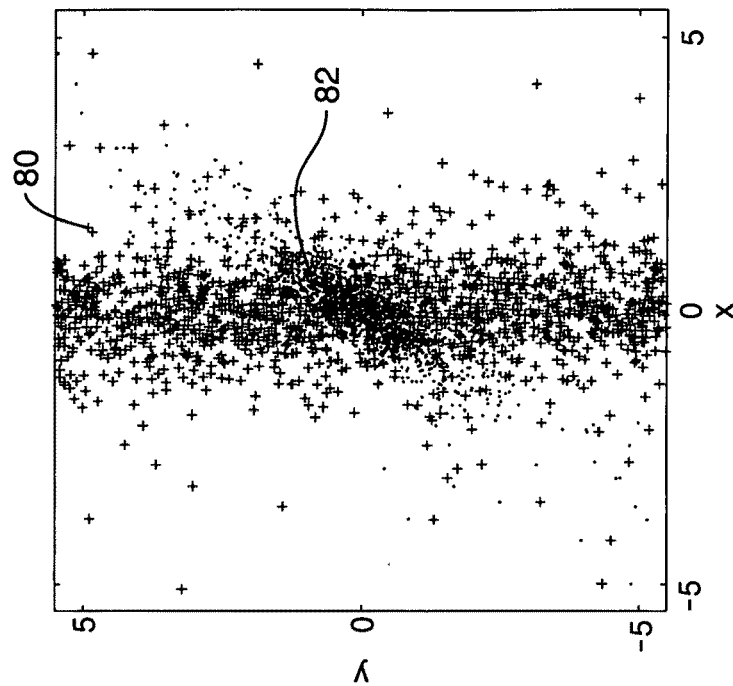
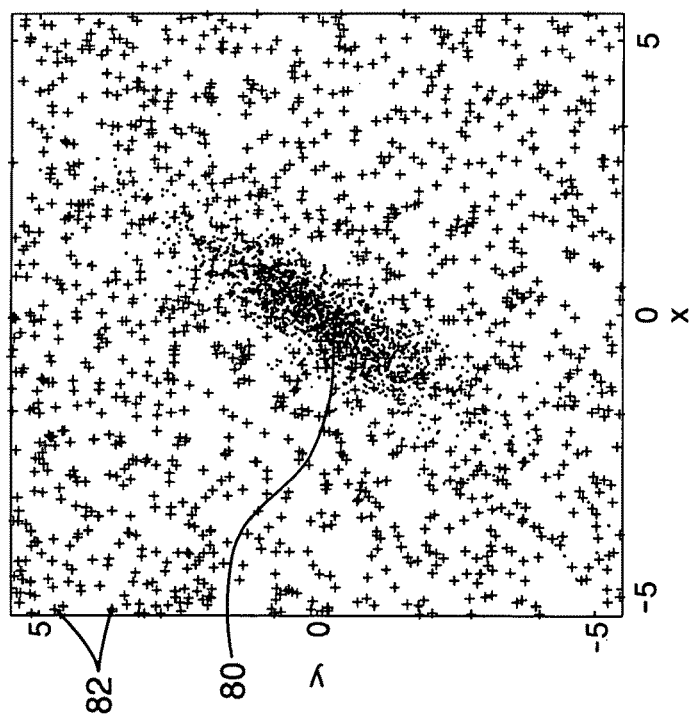

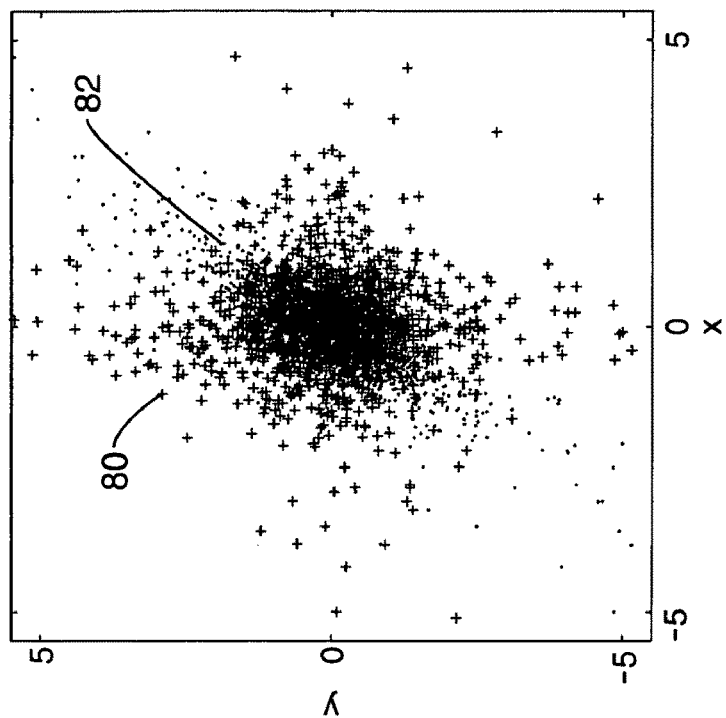
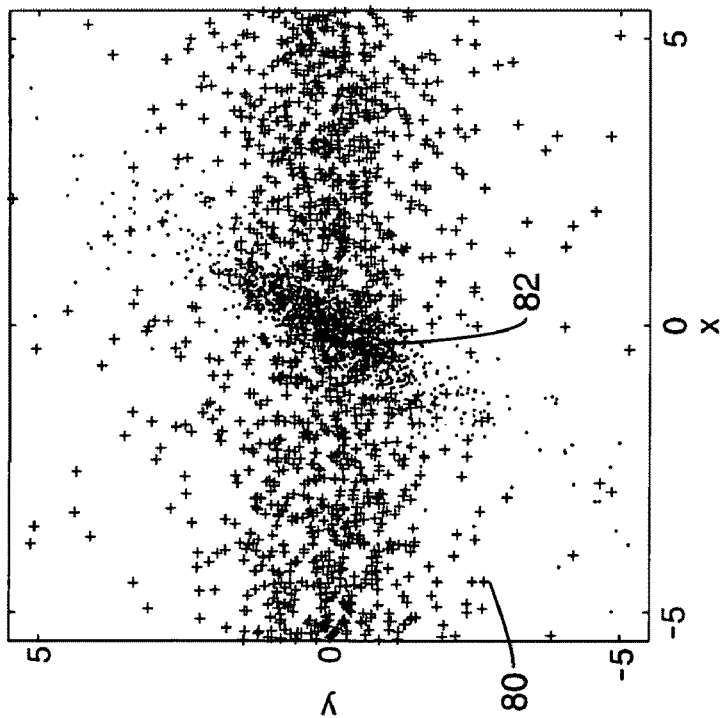

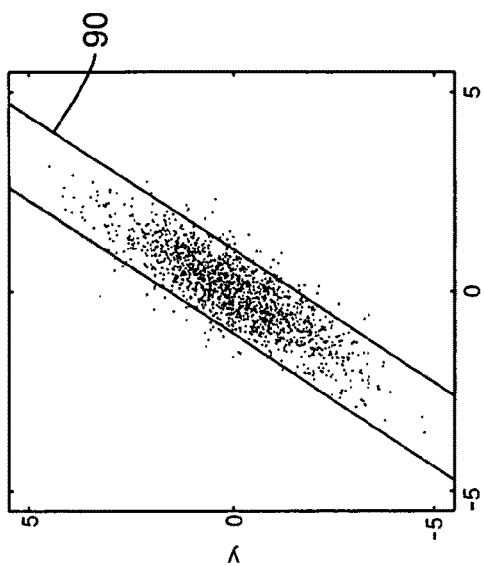
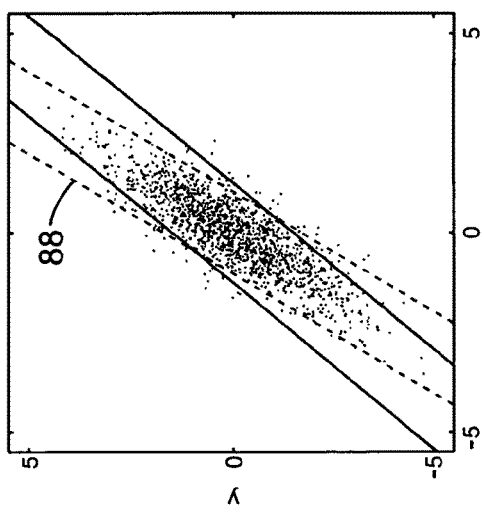
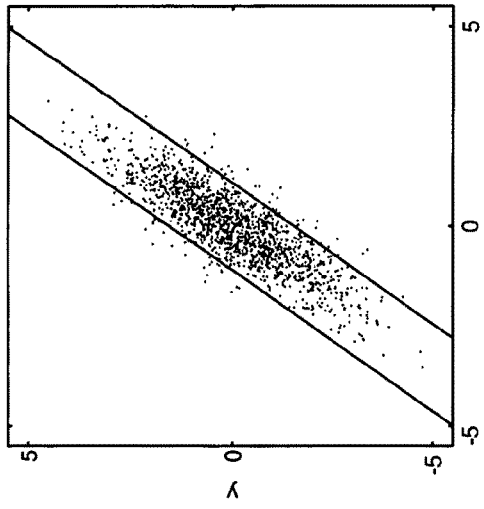
FIG. 8C
FIG. 8B
FIG. 8A

ANOMALOUS CHANGE DETECTION IN IMAGERY

CROSS-REFERENCE TO RELATED APPLICATIONS

This application claims priority from U.S. provisional application Ser. No. 60/944,437 filed on Jun. 15, 2007, incorporated by reference herein in its entirety.

STATEMENT REGARDING FEDERALLY SPONSORED RESEARCH OR DEVELOPMENT

This invention was made with Government support under Grant No. DE-AC52-06NA25396, awarded by the Department of Energy. The Government has certain rights in this invention.

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

A portion of the material in this patent document is also subject to protection under the maskwork registration laws of the United States and of other countries. The owner of the maskwork rights has no objection to the facsimile reproduction by anyone of the patent document or the patent disclosure, as it appears in the United States Patent and Trademark Office publicly available file or records, but otherwise reserves all maskwork rights whatsoever. The maskwork owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to change detection in imagery, and more particularly to anomalous change detection in imagery.

2. Description of Related Art

With decreasing costs of acquiring overhead imagery, and an increasing variety of available image modalities (from video to hyperspectral), image analysts have the ability to see more of the world in more detail than ever before. For precisely the same reasons, image analysts also have more images than they can look at, let alone analyze, which makes the automated analysis of imagery an imperative.

While the automated understanding of imagery is an extremely challenging long-term goal, the best hope in the near term may be data triage —concede that every image cannot be fully analyzed, but at least identify those images that are most desperately in need of an analyst's attention. This is where change detection can help.

While single images are indeed difficult to analyze, pairs of images can actually be easier. With two images of the same scene, there is a lot of context built right into the data. As the problem goes from finding interesting things in images to finding interesting changes in image pairs, it becomes more tractable. On the other hand, even the limited aim of detecting changes in imagery is itself extremely challenging.

Change detection in imagery is of broad general interest, but it is especially useful in remote sensing. Using pictures taken from satellite or airborne platforms, accurate maps can be made of what is on the ground. These maps are valuable, but they are not static: new highways are built, new agricultural fields are planted, new housing is constructed, old warehouses are bulldozed, wetlands are encroached, forests are burned. And it is what has most recently changed that usually is most keenly of interest.

Change detection is important in other imagery too. Using pictures of the sky taken from ground-based telescopes, changes can indicate asteroids, flare stars, potentially even new astronomical phenomena. In practice, these changes usually indicate terrestrial phenomena and image artifacts that need to be filtered out.

BRIEF SUMMARY OF THE INVENTION

The present invention includes systems and methods to identify pixels in pairs of co-registered images that correspond to actual anomalous changes within the set of images. By treating the problem as finding interesting changes in image pairs rather than interesting things in images, the problem becomes more tractable.

The present invention employs a distribution-based, rather than difference-based anomaly detection platform. An explicit "anomaly" or "background" distribution is identified, and the problem is reduced to binary classification with one class specified by the data and the other by this explicit distribution. The present invention employs a non-flat background distribution that is specified in terms of the distribution of the data.

The present invention also includes a resampling scheme that reduces the problem of anomalous change detection to a binary classification that a large variety of machine learning tools can solve.

One aspect of the invention is a method for identifying pixels in co-registered first and second images that correspond to anomalous changes within the images. The method comprises the steps of: selecting the first and second images for comparison, writing sample (x,y) pairs to represent a pixel at a specified location in the first and second image (wherein x represents the pixel from the first image, and y represents the corresponding pixel from the second image), estimating $P(x)$ and estimating $P(y)$ (wherein $P(x)$ and $P(y)$ comprise the distribution of pixels in the first image and second images, respectively, and wherein $P(x,y)$ comprises the distribution of (x,y) values in the first and second images), and computing for every (x,y) pair the ratio of $f(x,y)=P(x,y)/[P(x)P(y)]$.

The method may also include the step of selecting as anomalous changes the pixels (x,y) for which $f(x,y)$ is smaller than a predetermined threshold.

In one embodiment, at least one of P(x) and P(y) are non-uniform distributions. In one variation, $$P(x) = \int P(x, y) dy$$

and P(y) is a constant, wherein P(y) corresponds to a uniform background.

In a preferred embodiment, both P(x) and P(y) are non-uniform distributions. For example, $$P(x) = \int P(x, y) dy \text{ and } P(y) = \int P(x, y) dx.$$

In another embodiment, the method may further comprise directly modeling f(x,y), e.g. by assuming P(x,y), P(x), and P(y) are Gaussian distributions. This may be performed by computing the quadratic function $$[x^T \ y^T] K \begin{pmatrix} x \\ y \end{pmatrix},$$

wherein the matrix K is given by $$K = \begin{pmatrix} X & C^T \\ C & Y \end{pmatrix}^{-1} - \begin{pmatrix} X & 0 \\ 0 & Y \end{pmatrix}^{-1}.$$

Another aspect is a method for identifying anomalous changes in co-registered first and second images, including the steps of selecting said first and second images for comparison, writing sample (x,y) pair to represent a pixel at a specified location in the first and second image, generating a new image pair (X',Y') by scrambling the pixels in the first and second images, generating a normal set of (x,y) points in the original image and a background set of (x,y') points obtained from the scrambled image pair, and computing f(x, y) by distinguishing the normal set from the background set through binary classification.

In one embodiment, f(x,y) is computed with a binary classification scheme. The method may further include assigning parameters to the normal and background datasets set to classify the data, wherein a greater weight is assigned on the normal dataset than the background dataset.

Another aspect is a method for identifying anomalous changes in co-registered first and second images. The method comprises: selecting the first and second images for comparison, writing sample (x,y) pair to represent a pixel at a specified location in the first and second image, estimating the distribution of pixels in the first image and second image, estimating the distribution of (x,y) values in the first and second images, and computing for every (x,y) pair the ratio of the distribution of (x,y) values in the first and second images divided by the product of the distribution of pixels in the first image and the distribution of pixels in the second image.

In one embodiment, at least one of the distribution of pixels in the first image and distribution of pixels in the second image are non-uniform distributions. In a preferred embodiment, both the distribution of pixels in the first image and distribution of pixels in the second image are non-uniform distributions.

In another embodiment, at least one of distribution of pixels in the first image, the distribution of pixels in the second image and the distribution of (x,y) values in the first and second images are estimated as Gaussian distributions.

In one embodiment, the distribution of pixels in the first image comprises $$P(x) = \int P(x, y) dy,$$

and the distribution of pixels in the second image comprises $$P(y) = \int P(x, y) dx.$$

Alternatively, the distribution of pixels in the first image comprises $$P(x) = \int P(x, y) dy,$$

and the distribution of pixels in the second image comprises a constant, uniform distribution.

Another aspect is a system for identifying anomalous changes in first and second images. The system includes a first and second sets of image data, each having sample (x,y) pairs representing a pixel at a specified location in the first and second image, a means for computing a relationship between data in the first set and data in the second set based on a non-uniform distribution of data in the first set of image data and second set of image data, and a means for selecting data from the computed relationship falling within a threshold value as an anomalous change.

In one embodiment of the current aspect, the means for computing the relationship is configured to generate a new image data set by scrambling the pixels in the original data set of the first and second images, and distinguish the scrambled data set from the original data set with a binary classification scheme.

In another embodiment, the means for computing the relationship is configured to estimate the distribution of pixels and (x,y) values in the first and second images and calculate a ratio of the distribution of (x,y) values in the first and second images divided by the product of the distribution of pixels in the first image and the distribution of pixels in the second image.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1 illustrates a series of four aerial images. Images (a) and (b) differ in brightness sharpness, and contrast; also there is an actual anomalous change added to (b) in the lower left corner. Images (c) and (d) are close-ups of (a) and (b), illustrating the anomalous change added to the scene.

FIG. 5 illustrates an exemplary flow diagram of direct modeling approach assuming a known (e.g. Gaussian) distribution.

FIG. 6 illustrates an exemplary flow diagram of the selection process for the method of the present invention.

FIG. 7 includes a series of plots illustrating the resampling approach in accordance with the present invention FIG. 8 illustrates detection boundaries for different anomalous change detectors, applied to a Gaussian distribution with $d_x=d_y=1$.

Figure 9A:
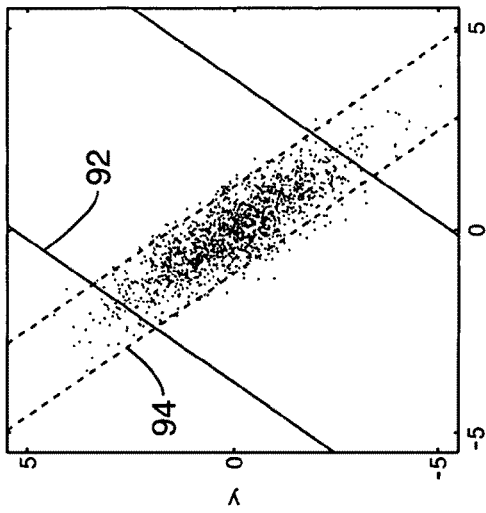
Figure 9B:
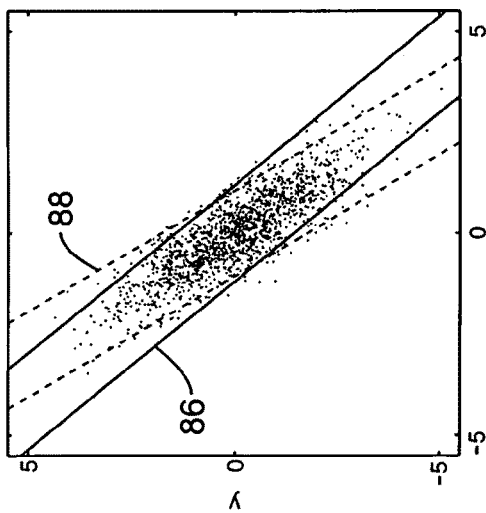
Figure 9C:
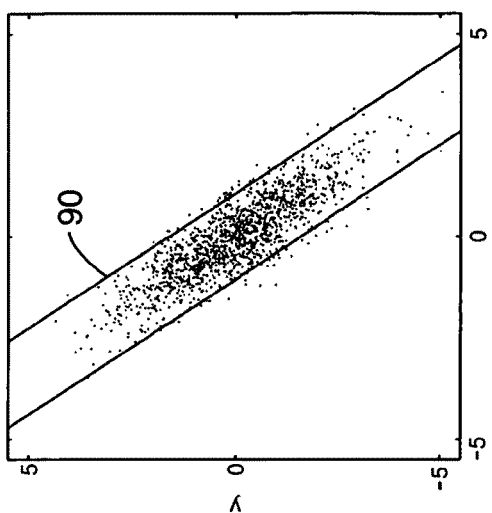

FIG. 9 is illustrates detection boundaries for different anomalous change detectors as in FIG. 8, except C=−1.2.

Figure 10A:
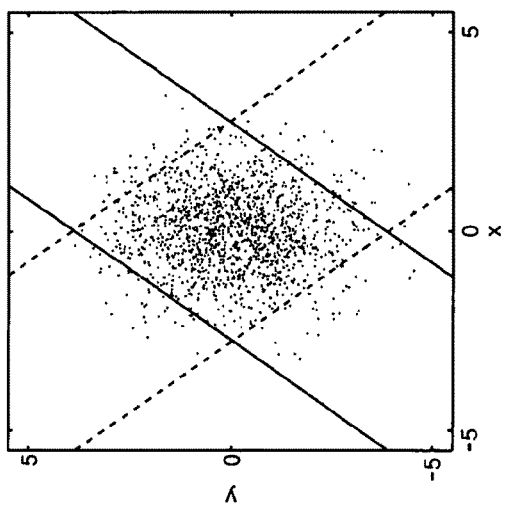
Figure 10B:
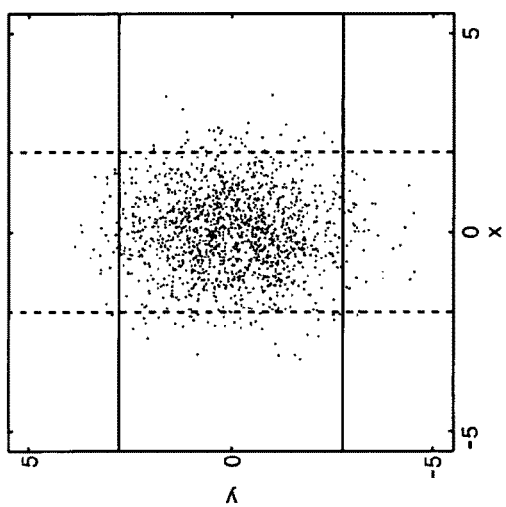
Figure 10C:
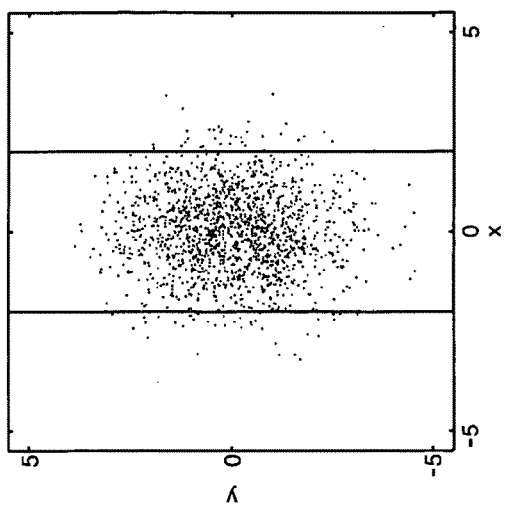

FIG. 10 illustrates detection boundaries for different anomalous change detectors as in FIG. 8, except with no correlation between the images, e.g. C=0.

FIG. 11 Illustrates a first set of test data (top row is elliptically contoured with a non-Gaussian distribution; bottom row is a Gaussian distribution) showing boundaries for distribution-based anomaly and anomalous change detectors.

FIG. 12 illustrates a second set of test data (with a Gaussian distribution) showing boundaries for distribution-based anomaly and anomalous change detectors.

FIG. 13 shows a series of images of star fields.

DETAILED DESCRIPTION OF THE INVENTION

Referring more specifically to the drawings, for illustrative purposes the present invention is embodied in the system and methods generally shown in FIG. 1 through FIG. 13. It will be appreciated that the apparatus may vary as to configuration and as to details of the parts, and that the method may vary as to the specific steps and sequence, without departing from the basic concepts as disclosed herein.

Although there are cases in which an image analyst has a very specific change in mind, e.g., the appearance of camouflaged vehicles or the harvesting of illicit crops, the present invention is directed to the more open-ended problem of anomalous change detection. For the anomalous change detection problem, you have a pair of images, taken of the same scene, but at different times and typically under different viewing conditions. Generally, an image analyst is looking for interesting differences between the two images. There will be some differences that are pervasive, perhaps due to sensor differences (e.g. over-all contrast, brightness or focus differences, or maybe due to environmental differences (e.g. illumination, atmospheric or even seasonal changes). If the green fields in an image have all turned brown, then that is a real change, but (particularly if it is observed over a sizeable fraction of the images) it is not necessarily an interesting one. However, there may also be changes that occur in only a few pixels. These rare changes are potentially indicative of something truly changing in the scene, and the focus of the present invention is to use anomaly detection to find them.

There is not a good mathematical definition of "interesting," but changes that are rare or unusual are good candidates. Furthermore, it is undesirable to be confounded by unusual pixels that are, in some sense, "similarly unusual" in both images. It therefore makes sense to bring the tools of anomaly detection to bear on this aspect of the change detection problem.

An unusual change is not necessarily meaningful, but since unusual changes are by definition rare, the false alarm rate is generally not high. Also, unlike pervasive changes, which are readily evident by just looking at the imagery, unusual changes point the analyst to spatially small changes that could easily be overlooked. There is no mathematical characterization of what constitutes a "meaningful" change, but "unusual" can be characterized, and that provides a metric for optimizing algorithms. In some instances, the most interesting change is no change at all—in an area with clear-cut logging, it would be the few trees left standing that would be the unusual changes.

With the view that interesting changes are anomalous changes, a framework is devised for anomalous change detection that builds on the machine learning formalism for anomaly detection. The present invention is characterized as distribution-based, rather than difference-based, and several variants of distribution-based anomaly detection are provided.

The anomalous change detection problem is illustrated in FIG. 1, showing show two images that are both artificially derived from the same initial IKONOS (Space Imaging, Inc., 1999) scene, for which there are both broad overall differences and one small anomalous difference. The aim of the present invention is to identify this anomalous change. Between image (a) and image (b), we can see that image (b) is brighter, and sharper, but has less contrast. Every pixel in the image has changed, though mostly in predictable ways. Images (c,d) are close-ups of the images in (a,b), and exhibit the same differences in brightness, focus, and contrast. Image (d) also exhibits an anomalous change—an extra car 10 has been (artificially) added to the scene.

Two distinctions can be made of the above illustration. The first is that anomalous change is different from (and rarer than) changes that occur over the whole scene. The second is that the anomaly of interest is an anomalous change, not an anomaly of the scene itself.

1. Difference-Based Change Detection

Presuming two corresponding images, x is assigned the value of a pixel in the first image, and y is the value of a pixel in the second image. Consider (x,y) pairs with $x_i \in \mathbb{R}^{d_x}$ corresponding to the spectra at the ith pixel of the first image, and $y_i \in \mathbb{R}^{d_y}$ the spectrum at the corresponding pixel in the second image. Here, $d_x$ and $d_y$ are the number of spectral channels in the first image and second image respectively: e.g. $d_x=1$ for panchromatic imagery, $d_x=3$ for RGB imagery, and $d_x$ can be a hundred or more for hyperspectral imagery. Some change detection algorithms require that both images have the same number of spectral channels: $d_x=d_y$. However, that is not necessary for the formulation of the anomalous change detection problem.

The change detection problem seeks what pixels i are $x_i$ and $y_i$ different; or, more specifically, for what pixels are they "unusually" different.

1.1. Simple Subtraction

The simplest algorithm for change detection is to subtract the two images, and identify the pixels where the difference has the greatest magnitude. For this algorithm to work, it is important that the two images be taken with a similar sensor, or at a minimum $d_x=d_y$. If there is more than one spectral channel, the vector difference e=y−x is converted into a scalar measure of anomalousness. A natural choice is the Euclidean distance $e^T e$, but a more flexible alternative is the Mahalanobis distance from the centroid of the error vectors. Let ẽ=e−⟨e be the difference between the difference vector e and the centroid $\langle e \rangle$. The angle brackets $\langle$ indicate the average over the scene (or possibly over the entire archive). The anomalous measure is given by the Mahalanobis distance $\tilde{e}^T = \langle \tilde{e}^T \langle^{-1} \tilde{e}$ where $\langle \tilde{e}\tilde{e}^T \rangle$ is a covariance matrix. This is related to the RX anomaly detector, and one way to interpret this choice is that it takes direct differences, but looks for anomalies (outliers) among those differences.

1.2. Equalization

Straight differencing can be confounded even by simple miscalibrations in the data. A difference in offset can be taken care of with the subtraction of the centroid ($\tilde{e}=e-\langle e \rangle$ above), but a difference in scale will be problematic. The equalization idea is to bring both data sets to have the same scale and offset.

Equalizing functions $H_x(x)$ and $H_y(y)$ are applied to the images separately, and then subtracted $H_x(x)-H_y(y)$. $H_x$ and $H_y$ are functions that bring the x and y data to a common foundation. For instance, if $d_x=d_y=1$, then histogram equalization would bring both datasets to a uniform distribution, and would take out any differences in contrast or calibration.

Another useful option for positive multispectral data is to normalize each point using $H_x(x)=x/|x|$, and similarly for $H_y$. This effectively transforms to a space in which all the data is on the unit sphere, and distances between data samples are spectral angle distances.

For hyperspectral data, $H_x$ and $H_y$ may be used as the functions that respectively whiten the x and y data. Used directly, this requires that $d_x=d_y$. This is the idea behind the "covariance equalization" approach. The mean values are subtracted from the data $x \leftarrow x - \langle x \rangle$ and $y \leftarrow y - \langle y \rangle$. Then, define the covariance matrices for each image: $x = \langle xx^T \rangle$ and $y = \langle yy^T \rangle$. Then the whitened difference is given by $$E = Y^{-1/2}y - X^{-1/2}x \quad (Eq. 1)$$

and the Mahalanobis distance $e^T = \langle ee^T \rangle e$.

1.2.1. Choosing R

An approximation $y \approx \hat{y} = L^*x$ is derived where $L^*$ is given by the expression $L^* = Y^{1/2}RX^{-1/2}$. This approximation employs an orthonormal matrix R that is not formally specified, but in practice is taken to be R=I. In this special case, defining the error of the approximation by $e = y - L^*x$ and defining anomalousness as $e^T = \langle ee \rangle e$ produces the same result as subtracting the whitened images in Eq. (1).

However, this unspecified matrix R provides an opportunity for further optimization. This R may be interpreted as the rotation that best "aligns" whitened $X^{-1/2}x$ with whitened $Y^{-1/2}y$. Given the identification $$y \approx L^*x = Y^{1/2}RX^{-1/2}x \quad (Eq. 2)$$

or equivalently $$Y^{-1/2}y \approx RX^{-1/2}x \quad (Eq. 3)$$

multiply both sides by $x^T X^{-1/2}$ $$Y^{-1/2}yx^T X^{-1/2} \approx RX^{-1/2}xx^T X^{-1/2} \quad (Eq. 4)$$

and then average both sides $$Y^{-1/2}CX^{-1/2} \approx RX^{-1/2}XX^{-1/2} = R \quad (Eq. 5)$$

where $C = yx^T$ is a cross-correlation matrix. This suggests an expression for R that is not necessarily orthogonal, but this can be "fixed" by using a singular value decomposition of the left hand side. Write $$Y^{-1/2}CX^{-1/2} = USV^T \quad (Eq. 6)$$

with U and V orthogonal, and S non-negative and diagonal. Since S corresponds to the "scale" of the matrix, this can be factored out using the simple (but ad hoc) approach of setting S=I. Specifically, $R = UV^T$.

This choice of R requires the computation of C, which is something that the original covariance equalization took pains to avoid. However, this provides is a linear anomalous change detector that is potentially better than the standard covariance equalization. Furthermore, when $d_x \neq d_y$, this method prescribes a rectangular R that enables the covariance equalization approach to address the $d_x \neq d_y$ case. For the panchromatic $d_x = d_y = 1$ case, R is restricted to scalar values $\pm 1$.

1.3. Regression

Where equalization tries to adapt both images to a common foundation, regression attempts to directly fit a function that transforms one image into the other. Informally speaking, this function is the "correction" that accounts for the different imaging conditions in the second image vis-à-vis the first. The idea is to fit a function $f: \mathbb{R}^{d_x} \to \mathbb{R}^{d_y}$ such that $y \approx \hat{y} = Lx$ is a good approximation, and then to compute differences $$e = y - \hat{y} = y - y(x) \quad (Eq. 7)$$

These differences can then be assessed with the usual Mahalanobis approach, by looking at the scalar values of $e^T \langle ee^T \rangle e$.

The linear variant of this, as applied in hyperspectral remote sensing, goes by the name chronochrome. Here, the idea is to fit a linear map L such that $$y \approx \hat{y} = Lx \quad (Eq. 8)$$

Here, L is fit using least-squares. Defining an error matrix $$E = \langle (y-Lx)(y-Lx)^T \rangle \quad (Eq. 9)$$

one can show that the trace of E is minimized when $L = CX^{-1}$. The essence of the change detection algorithm is to find changes between y and $\hat{y} = Lx$. Write $$e = Y - CX^{-1}C^T \quad (Eq. 10)$$

and compute the covariance $\langle e^T \rangle = Y - CX^{-1}C^T$. The largest changes e, in the sense of Mahalanobis distance, are given by the largest values of $e^T \langle ee^T \rangle e$, or $$(y - CX^{-1}x)^T (y - CX^{-1}C^T)^{-1} (y - CX^{-1}x) \quad (Eq. 11)$$

The comparison of this quantity to an appropriate threshold defines the chronochrome anomaly detector. The boundary that separates anomalous changes from normal is an elliptical cylinder centered on the axis defined by $y = CX^{-1}x$.

An idiosyncrasy of the chronochrome is that it is asymmetric with respect to x and y. If one instead looks for a linear map such that $x \approx \hat{x} = L'y$, and minimizes $|x - L'y|^2$, then one obtains a different chronochrome detector: namely, $$(x - C^T Y^{-1} y)^T (X - C^T Y^{-1} C)^{-1} (x - C^T Y^{-1} y) \quad (Eq. 12)$$

which leads to a different cylinder, whose axis is specified by $x = C^T Y^{-1} y$.

2. Distribution-Based Change Detection

Unlike the approaches in the previous section, the distribution-based algorithms of the present invention are not built around a large subtraction step in the middle. Here, x and y values are treated as if drawn from a parent distribution P(x, y), and infer anomalous changes based on properties of that distribution. In keeping with a central tenet of machine learning philosophy, these properties may be inferred without directly estimating P(x, y) itself. In particular, by recasting the anomalous change detection problem in terms of a ratio of distributions, proven machine-learning algorithms may be used to identify optimal boundaries in the (x, y) space.

With P(x, y) being the probability distribution from which data samples $(x_i, y_i)$ are drawn, the goal is to find a function $f(x, y)$ with the property that $f(x,y) > 0$ identifies (x, y) as an anomalous change. A family of functions $f_\alpha(x,y)$, is constrained to have the property that $$\int I\{f_\alpha(x, y) > 0\} P(x, y) dx dy \le \alpha \quad \text{(Eq. 13)}$$

where I is the indicator function; it is one if its argument is true, and zero otherwise. This constraint ensures that $f_\alpha(x, y)$ will, on average, incorrectly identify no more than a fraction $\alpha$ of the normal data samples as anomalies. Thus, $\alpha$ bounds the false alarm rate, or, in the language of hypothesis testing, is the "size" of the detector.

Subject to the constraint in Eq. 13, the best anomaly detectors are those that find the most anomalies. But if we don't know what anomalies are, how can we measure this? The traditional approach has been to effectively posit a uniform background of anomalies (see section 2.1 below). This leads to a minimum volume formulation for anomaly detection; the aim is to find a function $f_\alpha(x, y)$ which satisfies Eq. 13 and that minimizes the volume $$V = \int I\{f_\alpha(x, y) < 0\} dx dy \quad \text{(Eq. 14)}$$

For smooth $P(x, y)$ when the volume is minimized, the $f(x, y)=0$ boundary occurs at a contour of constant density $P(x, y)=\rho$. Anomalies are interpreted as data that occur in low-density areas of phase-space, and where the density is low (specifically $P(x, y)<\rho$), we will have $f(x, y)>0$, and the sample $(x, y)$ will be considered anomalous.

A more general approach is to define a "background distribution" $Q(x, y)$ and minimize the volume with respect to this distribution:

$$V_Q = \int I(f_\alpha(x, y) < 0) Q(x, y) dx dy \quad \text{(Eq. 15)}$$

2.1 Straight Anomaly Detection

Application of standard anomaly detection in the combined $(x, y)$ space leads to contours of constant $P(x, y)$; these are optimal in the sense of enclosing the maximum fraction of the normal data with the minimum volume.

Anomaly (aka novelty) detection has been developed in the machine learning community, for applications from handwriting characterization to malicious executable detection.

By writing $P(x, y) \propto P(x, y)/U(x, y)$, where $U(x, y)$ is a constant, or uniform distribution, the contours sought are expressed in terms of a ratio of distributions. Points are sampled points from these two distributions: one set from $P(x, y)$ (the available and presumed normal data) another from $U(x, y)$ (uniformly random background distribution) to create a classification problem with the optimal solution being the contours sought. The samples from $P(x, y)$ are just the data from the two images, and the samples from $U(x, y)$ are just points sampled uniformly over a subset of $\mathbb{R}^{d_x-d_y}$ that encloses the support of $P(x, y)$.

These contours depend on an underlying background measure. Traditionally, the standard Lebesgue measure is used. However, the straight anomaly detection approach is not ideal for the change detection problem, because straight anomaly detection does not consider the change in going from x to y. It finds all anomalies, but the goal is to restrict attention to the anomalous changes.

2.2 Anomalous Change Detection

The system and methods of the present invention utilize a non-uniform background $Q(x,y)$ to tease out unusual changes in an image, without the confound of otherwise unusual pixels. The following approaches provide several variants that provide novel solutions to the anomalous change detection problem.

2.2.1 A Generalized Chronochrome

If it is desirable to know whether y is anomalous, conditioned on x, then the straight anomaly detection approach described in 2.2.1 above can be used, but only in the y component. In particular, focus is directed to the contours of the conditional distribution $P(y|x)=P(x,y)/P_x(x)$. Here, $P_x(x)$ is the marginal distribution, given by $$P_x(x) = \int P(x, y) dy \quad \text{(Eq. 16)}$$

This leads to $$P(y|x) \propto \frac{P(x, y)}{P_x(x) U(y)} \quad \text{(Eq. 17)}$$

where $U(y)$ is a constant, and corresponds to a uniform distribution over y. Thus, the background distribution includes a uniform y and non-uniform x. Again, the contours of the ratio of two probability distributions, $P(x,y)$ and $P_x(x)U(y)$, are sought. As well, this formulation permits use of the formalism of binary classification.

The two classes correspond to the distributions $P(x,y)$ and $P_x(x)U(y)$. Samples from $P(x,y)$ are just given by the data; samples from $P_x(x)U(y)$ can be generated from points $(x,y)$ where x is taken from random data points, and y is chosen uniformly over an interval of y that includes the support of $P(x,y)$. With this resampling scheme, neither $P(x,y)$ nor $P_x(x)$ are ever actually estimated.

When the data are Gaussian, then this approach leads to the linear chronochrome. Thus, it provides a natural generalization of the chronochrome for non-Gaussian data. And like the linear chronochrome, there is an asymmetry in x and y. The contours of $P(x|y)$ could also be sought, which would specify when x was anomalous, conditioned on y.

This asymmetry also has an arrow-of-time flavor. If the x image were taken before the y image, it seems more natural to consider $P(y|x)$, which, informally speaking, emphasizes finding anomalous y's conditioned on normal x's.

2.2.2 Anomalous Change Detection

A natural way to symmetrize the generalized chronochrome is to use a non-uniform background distribution $Q(x, y)=P_x(x)P_y(y)$ comprising level curves in the ratio of distributions given by $$\frac{P(x, y)}{P_x(x) P_y(y)} \quad \text{(Eq. 18)}$$

where $$P_x(x) = \int P(x, y)\, dy \text{ and } P_y(y) = \int P(x, y)\, dx.$$ (5)

Here, $P_x(x)P_y(y)$ is the distribution that would be exhibited by the data if x and y were independent. By using this as the background, anomalies are obtained whose (x,y) dependency is unusual compared to the dependency encoded in P(x,y).

Equation 18 may be computed from a direct modeling approach via Gaussian approximation (as shown in section 2.2.4), or via a resampling algorithm (as described further in section 2.2.3). With the resampling algorithm, the problem becomes once again one of binary classification: wherein one set of samples comes directly from the data, specifically (x,y) pairs with x and y taken from corresponding pixels in the two images; and the other set being resampled from the data by taking x from one pixel and y from a different pixel (see section 2.2.3, which describes the resampling approach in further detail).

The anomaly detector of Equation 18 eliminates the arbitrary choice of a uniform background entirely. Points (x,y) are considered an anomalous change pair only if P(x,y) is small and $P_x(x)$ and $P_y(y)$ are relatively large. That is, x and y are individually normal, but their relationship is unusual.

What is happening is that "rules" are learned from the data which characterize the relationship x↔y because they occur over a large number of pixels. Those pixels for which the x↔y relationship is inconsistent with this rule are identified as anomalous changes. The framework is quite general, as the two images need not have the same (or even the same number of) spectral bands. Furthermore, there is complete symmetry in the x↔Y.

2.2.3. Resampling Approach

Finding contours of the ratios in Eq. 17 or 18 may be accomplished via machine learning techniques that avoid actually estimating the distributions themselves. The problem is recast as a binary classification problem in which one class is given by the data, and the other class is given by a resampled variant of the original data. The contours that distinguish these classes are preferably found by standard machine learning tools, such as a support vector machine. Any of the machine learning tools described in the following articles may be used, and are herein incorporated by reference in their entirety: V. Vapnik, *The Nature of Statistical Learning Theory*, Springer, N.Y., 2nd ed., 1999; C. M. Bishop, *Neural Networks for Pattern Recognition*, Oxford University Press, New York, 1995; T. Hastie, R. Tibshirani, J. H. Friedman, *The Elements of Statistical Learning*, Springer, N.Y., 2001; R. O. Duda, P. E. Hart, David G. Stork, *Pattern Classification*, Wiley, N.Y., $2^{nd}$ ed., 2001.

In practice, the underlying distribution P(x; y) is not known, but instead there is a set of samples $\{(x_1, y_1), (x_2, y_2); \ldots\}$, which are presumed to be drawn from this distribution. The aim is to find anomalous pixel pairs among this set.

The resampling approach for anomalous change detection in accordance with the present invention identifies a normal and a background class, and produces samples from each class. The normal class is specified by the original data: $\{(x_1, y_1), (x_2, y_2); \ldots\}$. The background class is specified by an artificially generated dataset that is obtained from a resampling of the original data in which the alignment of x and y is shuffled. The resampling treats x and y independently, and produces a dataset that looks like $\{(x_i, y_j), \ldots\}$. where i and j are usually unequal. This resampled dataset corresponds to samples that could have been drawn from the distribution Q(x,y)=P(x)P(y) as detailed in section 2.2.2 above. Alternatively the resampled dataset may also be drawn from the distribution $P_x(x)U(y)$ having a uniform y as described in section 2.2.1 above.

FIG. 2 illustrates the resampling approach as applied to the Images in FIG. 1. Image (a) scatterplot of x versus y for the image data with x corresponding to image (a) in FIG. 1, and y corresponding to image (b) in FIG. 1. The dark points 20 correspond to the actual data, and the light points 22 corresponding to the resampled data. The circled points 24 correspond to the nine pixels that were artificially modified; the darkest circle 28 is the center of the 3×3 modification. The squares 26 indicate points that might be identified as anomalies, or outliers, in the distribution of actual data, but which do not represent particularly anomalous changes. Image (b) in FIG. 2 corresponds to image (b) in FIG. 1, indicating with a circle 24 the pixels that have actually been altered, and with squares the five "outlier" pixels identified in panel (a) of FIG. 2. These are the darkest pixels in the scene and appear as shadows in some of the wooded areas. Image (c) in FIG. 2 is similar to (a), but obtained after smoothing the images in panel (b). The effect of smoothing is to make the images more "alike" (so the dark diagonal band is narrower) and thereby to make the most anomalous changes more evident.

With samples from two classes, virtually any standard binary classification scheme known in the art may be used to train a discriminating function f(x,y) so that f(x,y)<0 implies (x,y) is in the anomaly class.

Pixels i, for which $f(x_i, y_i)$ is small (or negative with large absolute value) are identified as the most anomalous changes.

2.2.4. Direct Modeling via Gaussian Approximation

Considering the case in which the measured data are drawn from Gaussian distributions, the points (x,y) are drawn from a $d_x + d_y$ dimensional Gaussian distribution with mean zero and covariance given by the matrix $$\left\langle \begin{pmatrix} x \\ y \end{pmatrix} [x^T \; y^T] \right\rangle = \begin{pmatrix} X & C^T \\ C & Y \end{pmatrix}$$ (Eq. 19)

where superscript T indicates transpose, and $$X = \langle xx^T \rangle$$ (Eq. 20)

$$Y = \langle yy^T \rangle$$ (Eq. 21)

$$C = \langle yx^T \rangle$$ (Eq. 22)

The normal points are drawn from the distribution P(x,y), which is Gaussian with mean zero and covariance given by the matrix in Eq. 19. The goal is to identify boundaries in the combined (x,y) space (that is, in $\mathbb{R}^{d_x + d_y}$) that enclose most of these normal points, but outside of which anomalous changes will be found. The special case $d_x = d_y = 1$ leads to two-dimensional plots.

Finally, Eq. 23 and 24 are anomalous change detectors applied to a linear Gaussian model. Here, P(x,y) is Gaussian with covariance given by Eq. 19, and P(x) and P(y) are Gaussian with covariances given by X and Y, respectively. In this framework, anomalous changes are given by level curves of Eq. 18 up to translation and scale factors, the negative logarithm of Eq. 18 is the quadratic function $$[x^T \quad y^T] K \begin{pmatrix} x \\ y \end{pmatrix} \quad \text{(Eq. 23)}$$

where the matrix K is given by $$K = \begin{pmatrix} X & C^T \\ C & Y \end{pmatrix}^{-1} - \begin{pmatrix} X & 0 \\ 0 & Y \end{pmatrix}^{-1} \quad \text{(Eq. 24)}$$

3. Application of Anomalous Change Detection in Imagery

Figure 3:
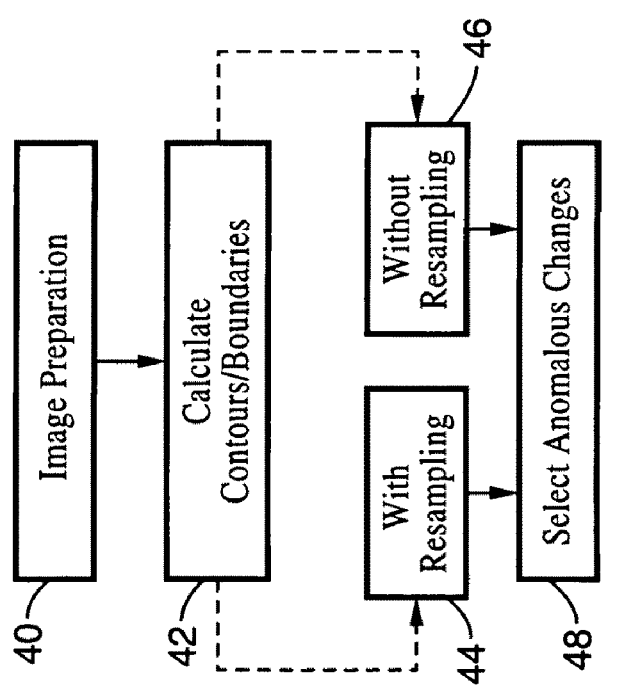
FIG. 3 illustrates an exemplary upper level flow diagram for a method of distribution-based change detection in accordance with the present invention.

FIG. 3 illustrates an exemplary upper level flow diagram for a method of distribution based change detection in accordance with the present invention. First the imagery must be prepared prior to calculation at step 40. This generally includes selecting before and after images for comparison. The first image (before) is denoted X and the second image (after) is denoted Y. The two images are then orthorectified (co-registered) to within a specified resolution. Next, the region in the co-registered image where the X and Y images actually overlap is identified (often, this is most of the image) to restrict attention to that region. X and Y are then redefined as the parts of those images that overlap with each other in the co-registered images. Finally, (x,y) are written to denote a pixel at a specified location in the co-registered pair of images, where x is the pixel from the X image and y is the corresponding pixel from the Y image.

Next, the contours/boundaries are calculated according to the selected distribution in step 42. Step 42 may be performed via two alternative approaches, e.g. via the resampling approach at step 44, as described above for section 2.2.3, or via direct modeling with Gaussian approximation at step 46, as described above in 2.2.4.

Figure 4:
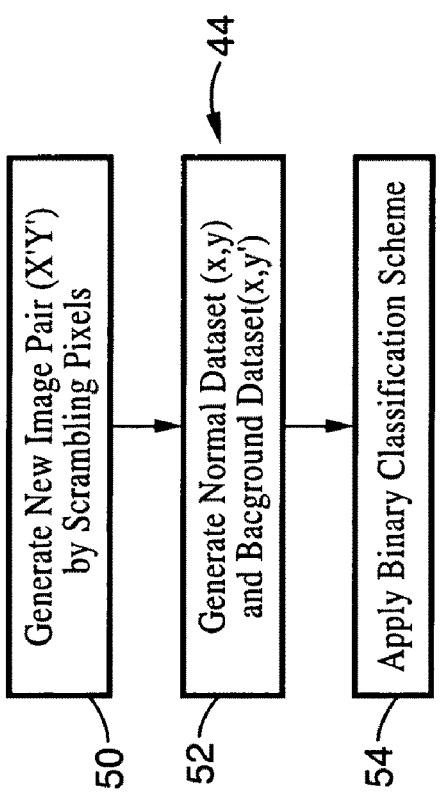
FIG. 4 illustrates an exemplary flow diagram for the resampling detector of the present invention.

Referring to FIG. 4, the resampling approach 44 is illustrated in accordance with the present invention. First, a new image pair (X',Y') is obtained by scrambling the pixels in the images at step 50.

At step 52, two datasets are generated: 1) the "normal" set of (x,y) points in the original image; and 2) a "background" set of (x,y') points obtained from the scrambled image pair. The normal set is labeled with −1, and the background set with labeled with +1.

Finally, step 54 employs a binary classification scheme from machine learning (e.g. a one class support vector machine or similar method readily available in the art) to distinguish the two datasets. The appropriate parameters are set (e.g., put more weight on the normal data) so that most of the normal set is classified correctly. For most binary classifiers, this provides a real-valued function f(x,y), the sign of which will give the predicted class label.

Referring to FIG. 5, the direct modeling approach 46 is illustrated in accordance with the present invention using a Gaussian model and equations 23 and 24. First, P(x), the distribution of pixel values in the X image, is estimated with Eq. 16. at step 60. For instance, the mean and covariance of all the pixels are computed, and P(x) is treated as a Gaussian distribution.

Next at step 62, P(y) is estimated in the same way as in step 60.

Next, P(x,y), the distribution of (x,y) values in the co-registered pair is estimated as step 64. Again, this might be done using a Gaussian, as done in step 60.

Finally, for every (x,y) pair the ratio of f(x,y)=P(x,y)/[P(x)P(y)] (Eq. 18) is computed.

After computation of the contours, the data is parsed for anomalous changes in step 48, which is illustrated in greater detail in FIG. 6.

Those points with the smallest values of f(x,y) will be presumed to be the most likely candidates for anomalous changes. A threshold value is chosen in step 70 so that a specified small percentage (e.g. 1%) of f(x,y) values are smaller than this threshold. Those pixels (x,y) for which f(x,y) is smaller than this threshold will be the anomalous changes and are selected in step 72. Finally, a human analyst may visually check the pixels where anomalous changes have been detected at step 74, and decide whether further follow-up or other action is warranted.

3.1 Experiment #1

FIG. 7 includes a series of plots illustrating the resampling approach in accordance with the present invention, detailed above in section 2.2.3. By resampling from the data, or from a uniform distribution in either or both of the x or y axes, the anomalous change detection problem is recast to one of binary classification. The data (dots 80) are to be classified as separate from the background (crosses 82). Image (a) illustrates experimental results for the resampling approach applied to straight anomaly detection, as detailed in section 2.1. Images (b) and (c) illustrate the resampling algorithm applied to the generalized chronochrome detector of section 2.2.1, with (b) being chronochrome (y fit as a function of x), and (c) being chronochrome (x fit as a function of y). Image (d) illustrates results for the resampling approach described in section 2.2.2.

FIG. 8 illustrates detection boundaries for different anomalous change detectors, applied to a Gaussian distribution with dx=dy=1. The data are shown as N=500 points sampled from the normal distribution P(x,y), parameterized by the covariance matrix in Eq. (15) with X=1, Y=2, and C=1.2. The boundary thresholds are chosen so that the same fraction (95%) of data points are within the normal regime. Image (a) illustrates covariance equalization based on Eq. (1). Image (b) illustrates a chronochrome detector, with the solid line 86 corresponding to y fit as a function of x (Eq. (11), and the dashed 88 line to x fit as a function of y (Eq. (12)). Image (c) is the minimum-width linear parallel boundaries 90.

FIG. 9 is illustrates detection boundaries for different anomalous change detectors as in FIG. 8, except C=−1.2. Image (a) shows standard covariance equalization (solid lines 92), which produces a very wide pair of parallel lines, whereas the R corrected approach (dashed lines 94) more nearly "follow" the flow of the data. Image (b) shows both variants of the chronochrome 86, 88 follow the negative correlation. Image (c) is the minimum-width linear parallel boundaries.

FIG. 10 illustrates detection boundaries for the different anomalous change detectors as in FIG. 8, except with no correlation between the images, e.g. C=0.

FIG. 11 illustrates boundaries for distribution-based anomalous detectors. Images (a,b,c,d) show distribution as an EC multivariate t distribution with v=5 degrees of freedom. Since the $\upsilon \rightarrow \infty$ limit leads to a Gaussian distribution, this EC distribution may be considered a generalization of the Gaussian. The generalized chronochrome (in (b) and (c)) is seen to give curved lines in this case, but qualitatively the boundaries are similar to the standard Chronochrome, which would have straight lines.

Images (e,f,g,h) of FIG. 11 illustrate a Gaussian distribution. In both cases, the covariance matrix uses X=1, Y=2, C=1:2 (same as FIG. 8). The data are shown as N=500 points sampled from the distribution P(x,y). In all cases, the boundaries are drawn so that they enclose 95% of the data.

Images 11 (a,e) illustrate straight anomaly detection as defined in section 2.2.1 for two elliptically contoured distributions. Since the boundaries defining anomalies are defined by the contours of the distribution, we have, in these two cases, that those boundaries are elliptical.

Images 11 (b,f) show chronochrome (y fit as a function of x) and images (c,g) show chronochrome (x fit as a function of y).

Figure 11C:
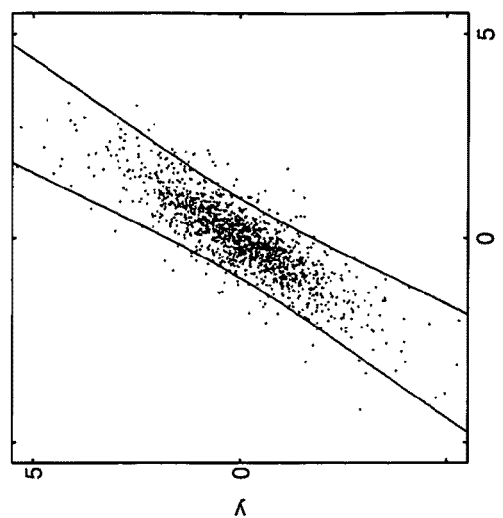
Figure 11B:
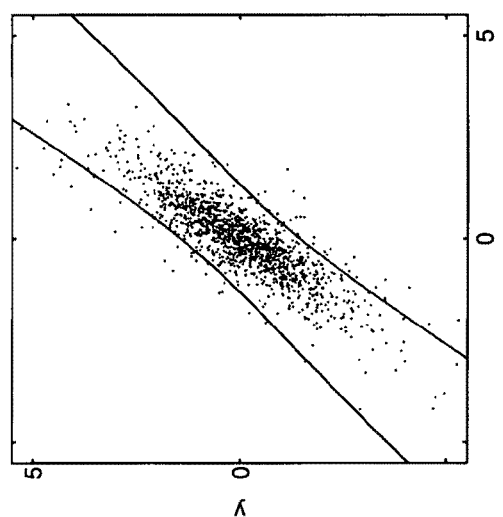
Figure 11A:
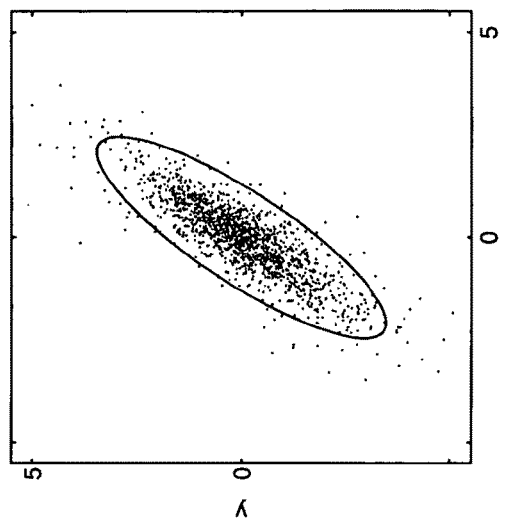
Figure 11F:
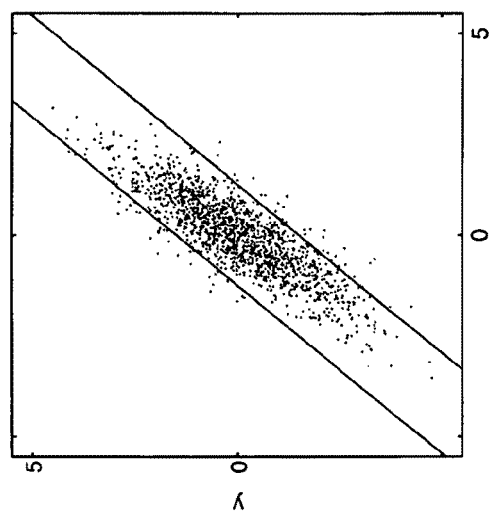
Figure 11E:
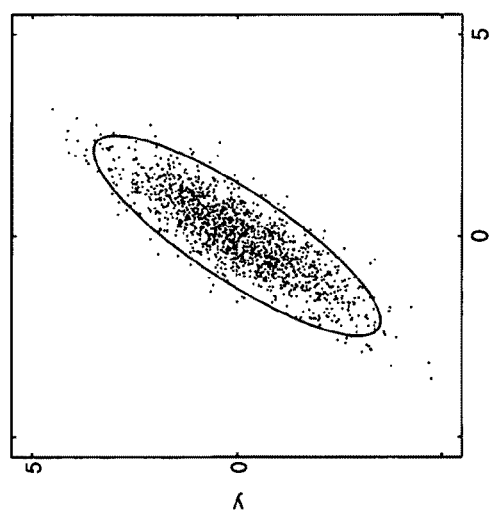
Figure 11D:
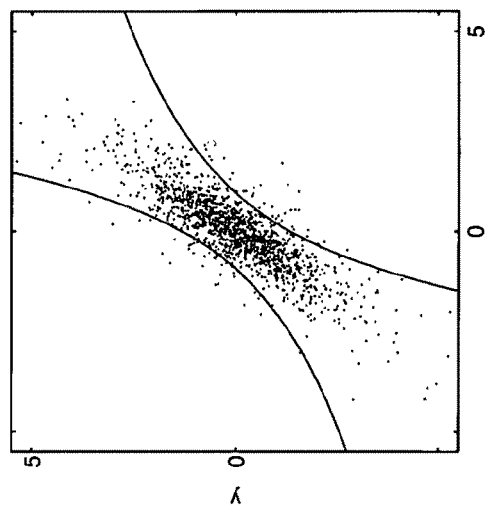
Figure 11H:
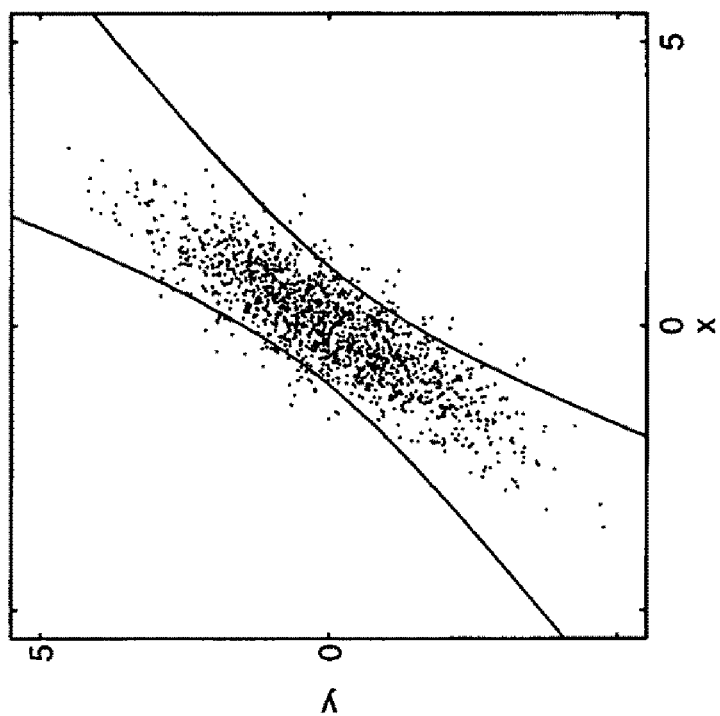
Figure 11G:
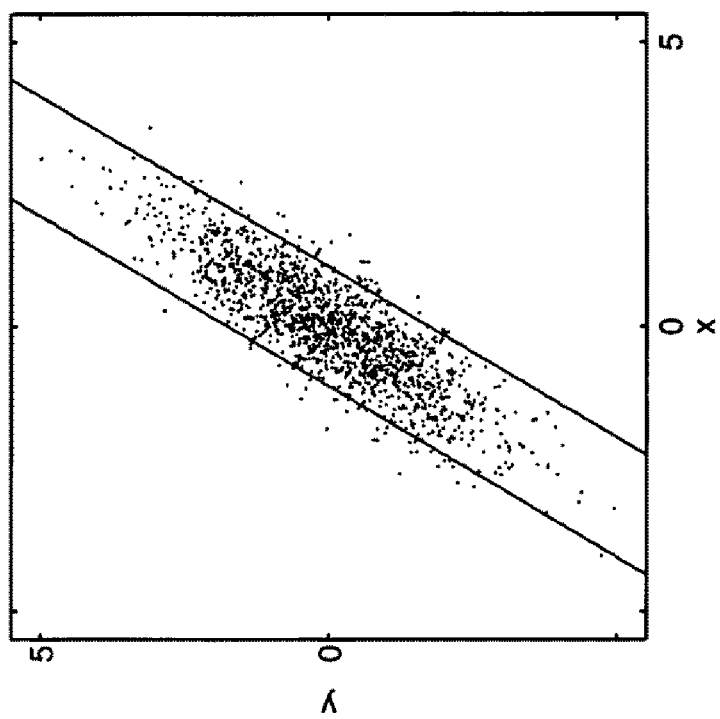
Figure 12B:
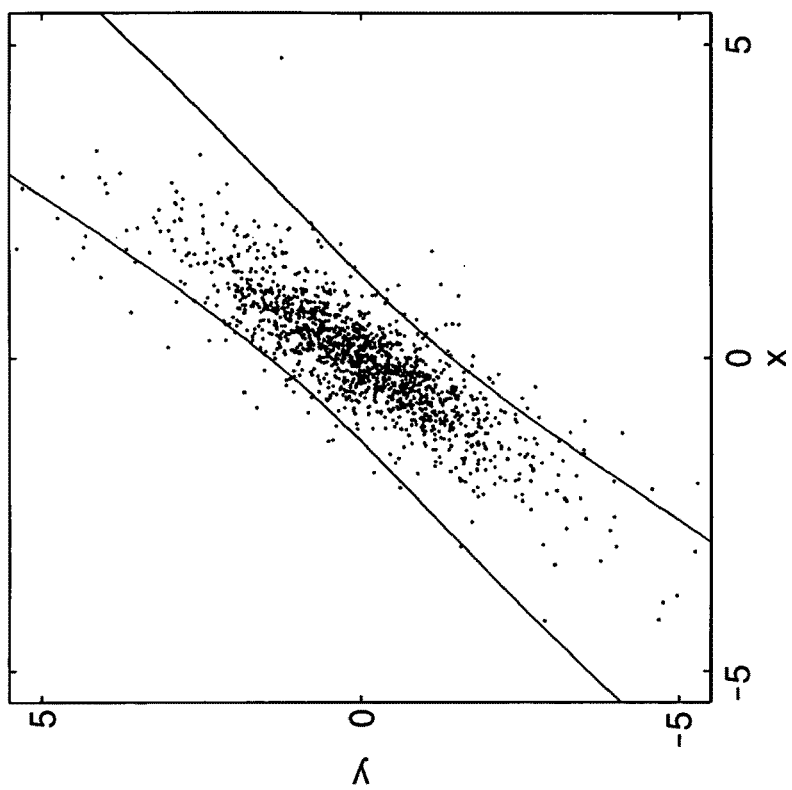
Figure 12A:
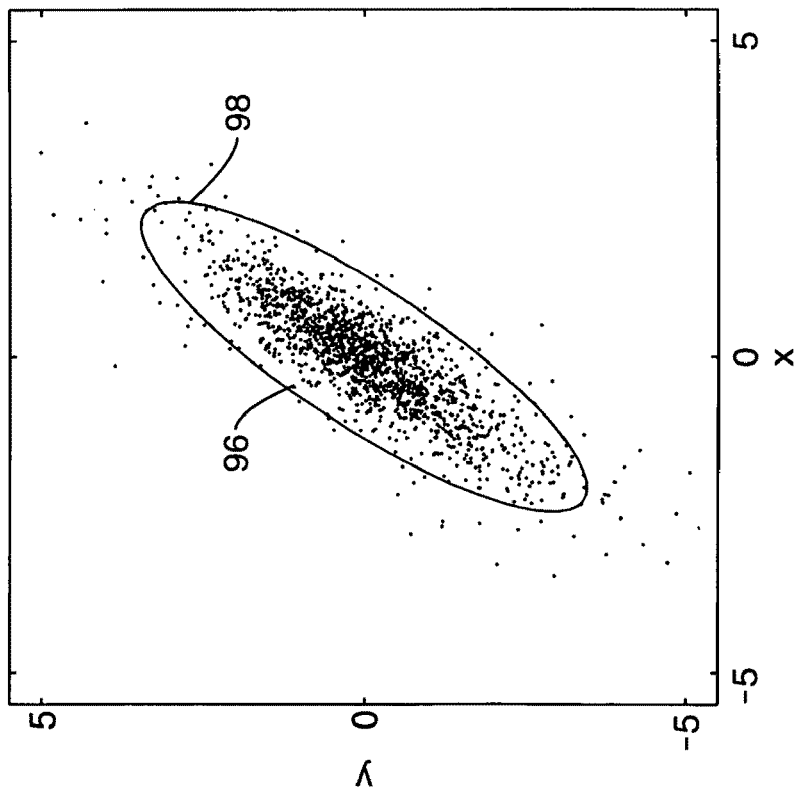
Figure 12D:
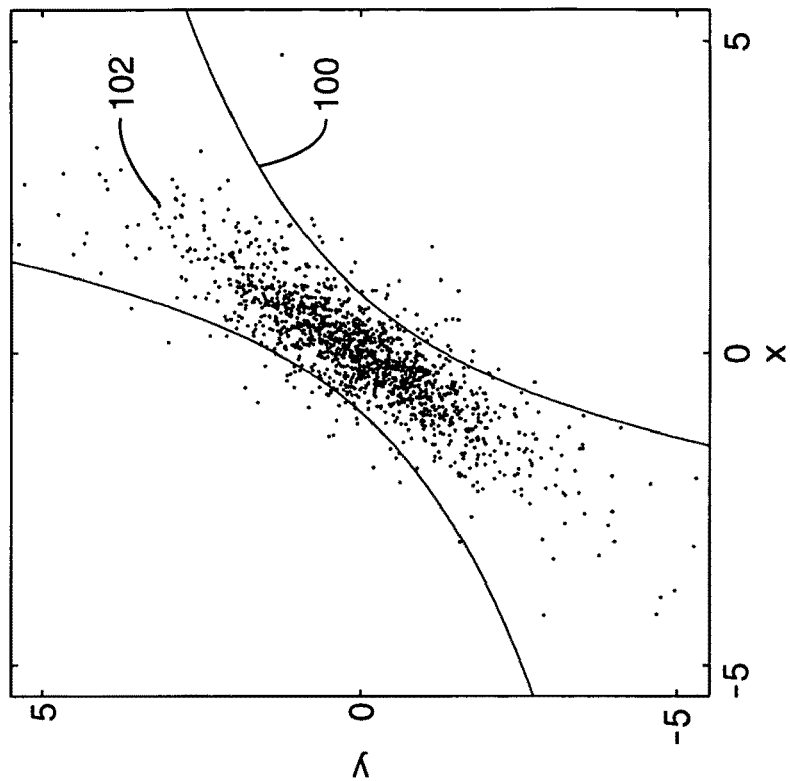
Figure 12C:
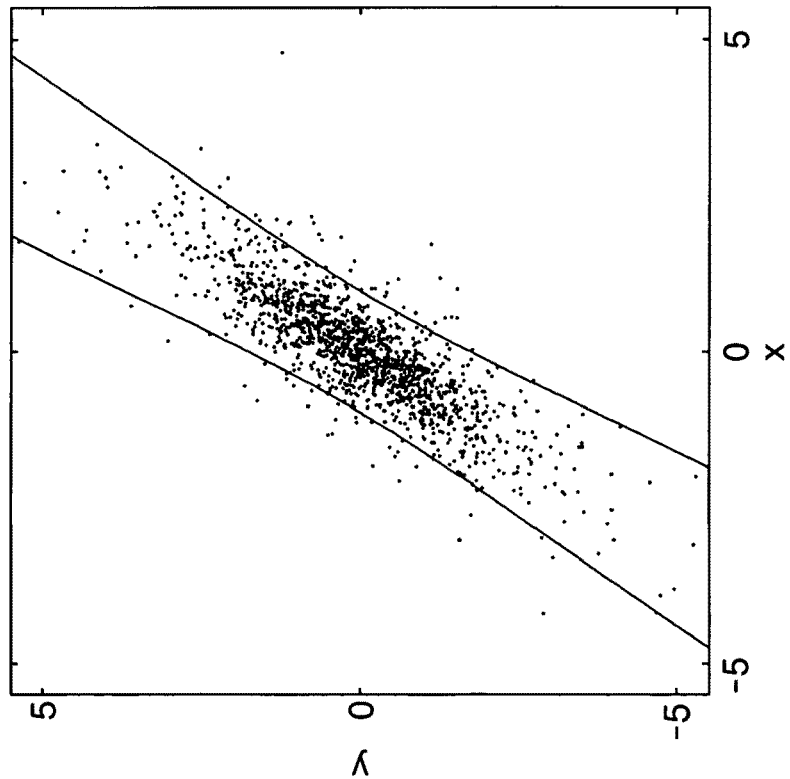
Figure 13B:
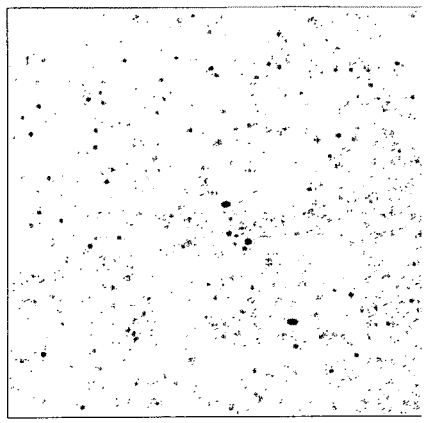
Figure 13D:
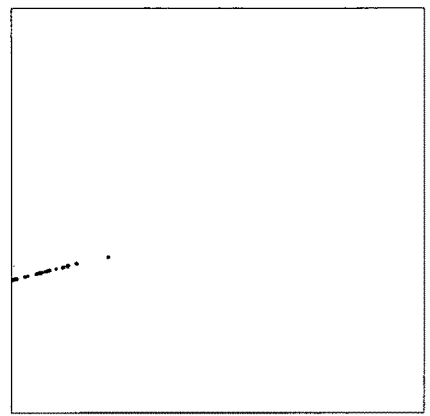
Figure 13A:
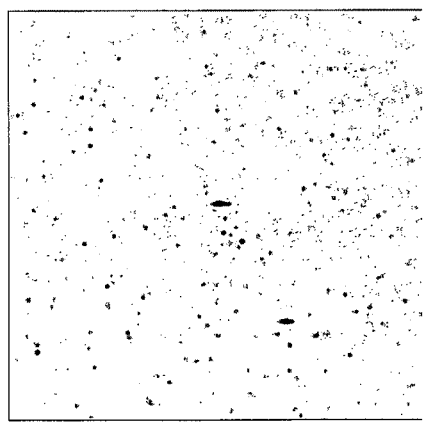
Figure 13C:
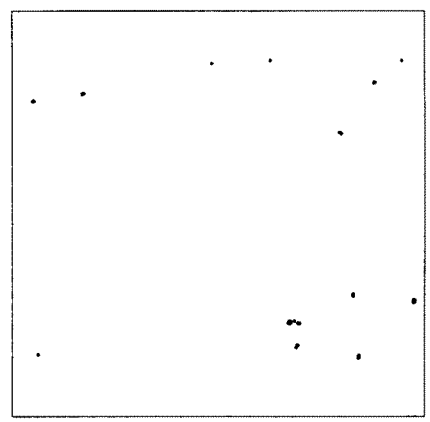

Images (d,h) show results from the detector described in Section 2.2.2. FIG. 11(h) illustrates what these boundaries would be for the simple case of single-band images (dx=dy=1) with X=1, Y=2, and C=1.2. Note that K is not a positive-definite matrix; so the contours in Eq. (23) are hyperbolic, not elliptical.

3.1 Experiment #2

FIG. 12 illustrates plots from a second experiment illustrating boundaries for different anomaly detectors for the simple case of Gaussian distributions, linear relationships, and dx=dy=1. The data are shown as N=500 points sampled from the normal distribution P(x,y), parameterized by the covariance matrix in with X=1, Y=2, and C=1:2. In these scatter-plots, each point corresponds to a pixel in a (hypothetical) scene, with x corresponding to the value at that pixel in the first image, and y is the value at the same pixel in the second image.

In image (a), the dashed elliptical lines 96 correspond to one and two sigmas. The heavy solid line 98 corresponds to an elliptical boundary that encloses 95% of the normal data. Points inside the boundary would be identified as normal, and points outside as anomalous.

Image (b) uses the same data, and two variants of the chronochrome are shown. The solid lines correspond to the standard variant, based on minimizing $|y-Lx|^2$; the heavy dashed lines illustrate the variant based on minimizing $|x-L'y|^2$. That the solid and dashed lines do not coincide illustrates the asymmetry between x and y in the chronochrome. Points between the parallel lines are classified as normal changes; points outside are anomalous changes.

Image (c) shows the covariance equalization detector is shown as parallel lines that are parallel to the long axis of the ellipse.

In image (d), the solid hyperbolic lines show the anomaly detector based on the distribution-based detector of the present invention. Also shown is the "background" distribution P(x)P(y), shown with dash-dotted ellipses 102 for the one and two sigma contours, and with a sample of N=500 points shown as plus signs. The hyperbolic lines 100 optimally separate the normal (dots) from the background (pluses) data, but still constrained to enclose 95% of the normal data.

4. Other Applications

While the above text was directed primarily at ground based imagery, the approaches of the present invention may also be directed at the sky. FIG. 12 shows images of star fields, with image (a) taken roughly a minute apart from image (b). Finding changes at this short timescale is a very challenging problem, but becoming feasible. Naive change detection would seek those pixels that had most changes between the two images, i.e., one computes a direct difference of the images and identifies the pixels with the largest absolute values. The top 100 such pixels are identified in image (c).

Closer inspection of these locations indicates that there is a slight misregistration between the two images. A better registration would include a small rotation angle, but because of this rotational error, the largest differences occur at the locations of stars away from the center of the image. An alternative approach follows the framework suggested here: two scatterplots are generated, one for the data and one for the resampled data, and binary classification is used to distinguish the two datasets. For practical reasons, with this example, the problem was simplified by only considering data for which a brightening occurred: $y_i > x_i$. A support vector machine with a radial basis kernel was employed, and a threshold was adjusted to produce the 100 "most anomalous" pixels. These are shown in image (d). In this case the anomalous changes are associated with a satellite streak in the second image.

In a production setting, one may include better image coregistration and explicit testing for airplane, meteor, and satellite streaks. When this is done, anomalous change detection can be applied anew, and it will undoubtedly find new artifacts that need to be identified and filtered out.

The proposed formulation does not explicitly require that the data be organized as pixels in images, but imagery provides both a natural setting and a compelling application for the change detection problem. As illustrated by the star field example above, co-registration of the two images is important. In practice, the co-registration is never exact, but the effect of small misregistration can often be ameliorated by some smoothing of the images.

Smoothing can also be useful if the anomalies of interest are of known a characteristic size the effect of the smoothing will be to suppress anomalous changes whose spatial extent is smaller than the smoothing kernel.

Figure 1A:
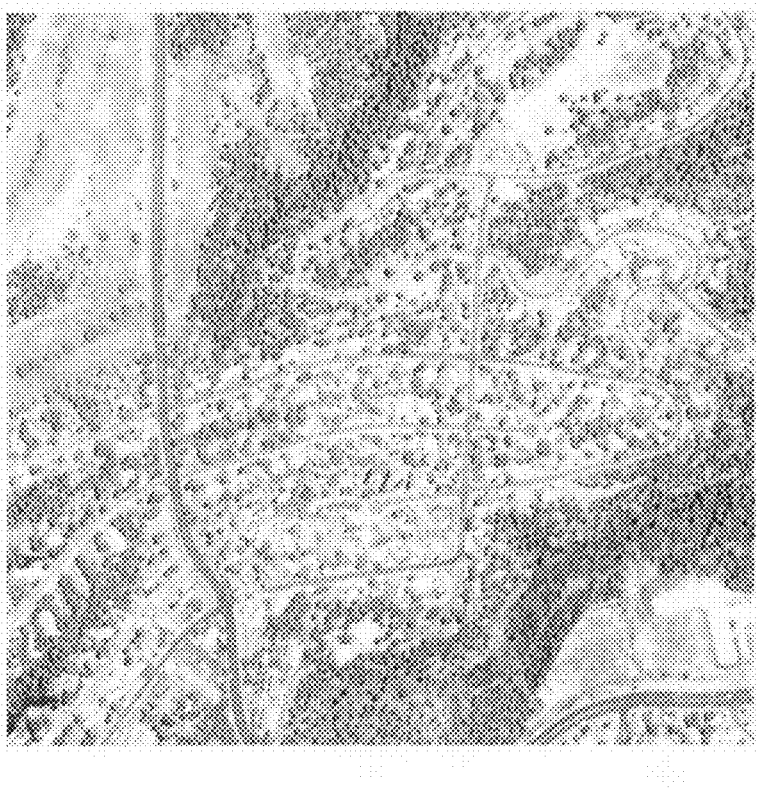
Figure 1B:
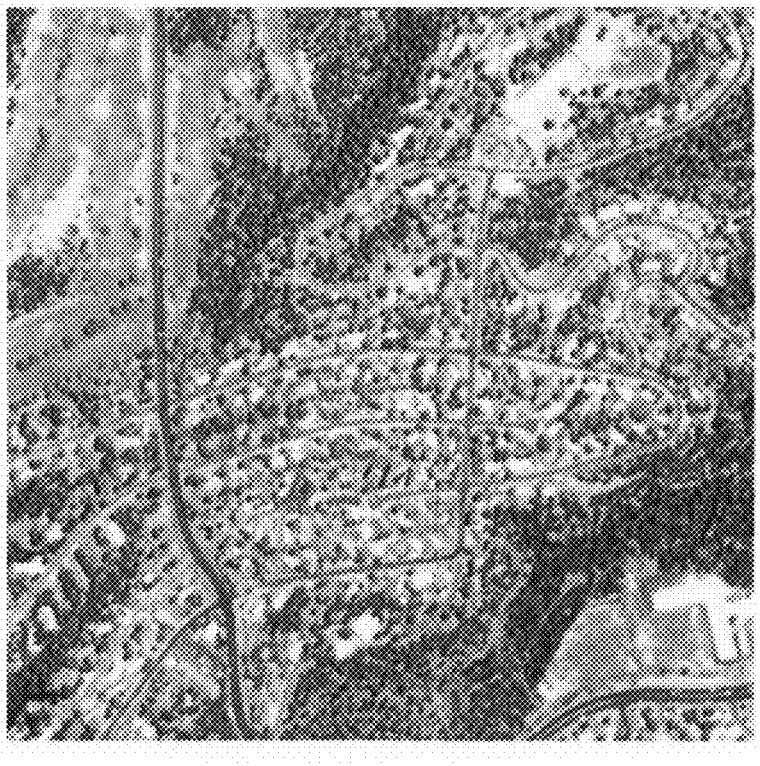
Figure 1D:
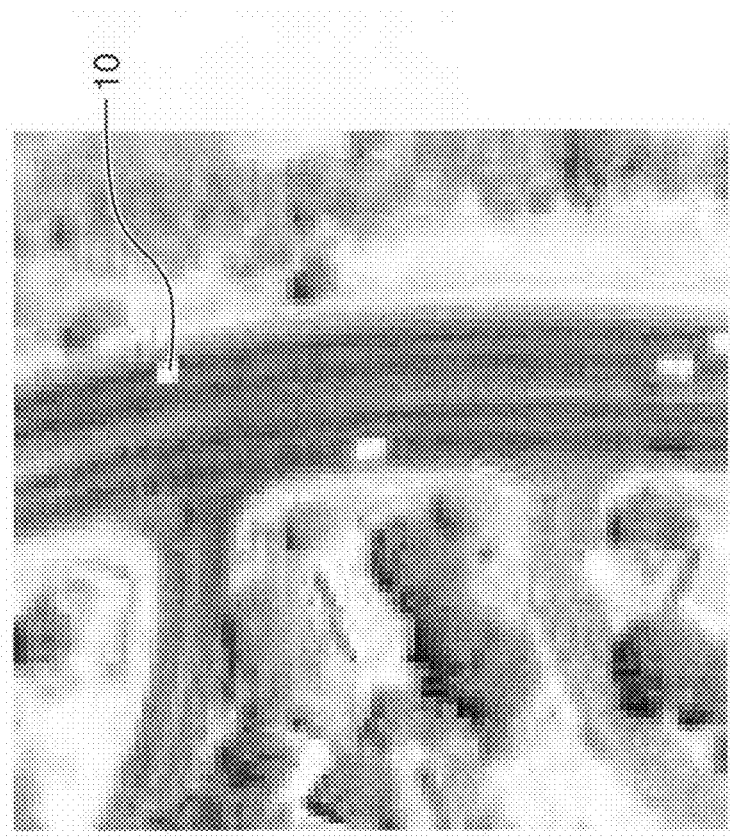
Figure 1C:
Figures 2A, 2B, 2C:
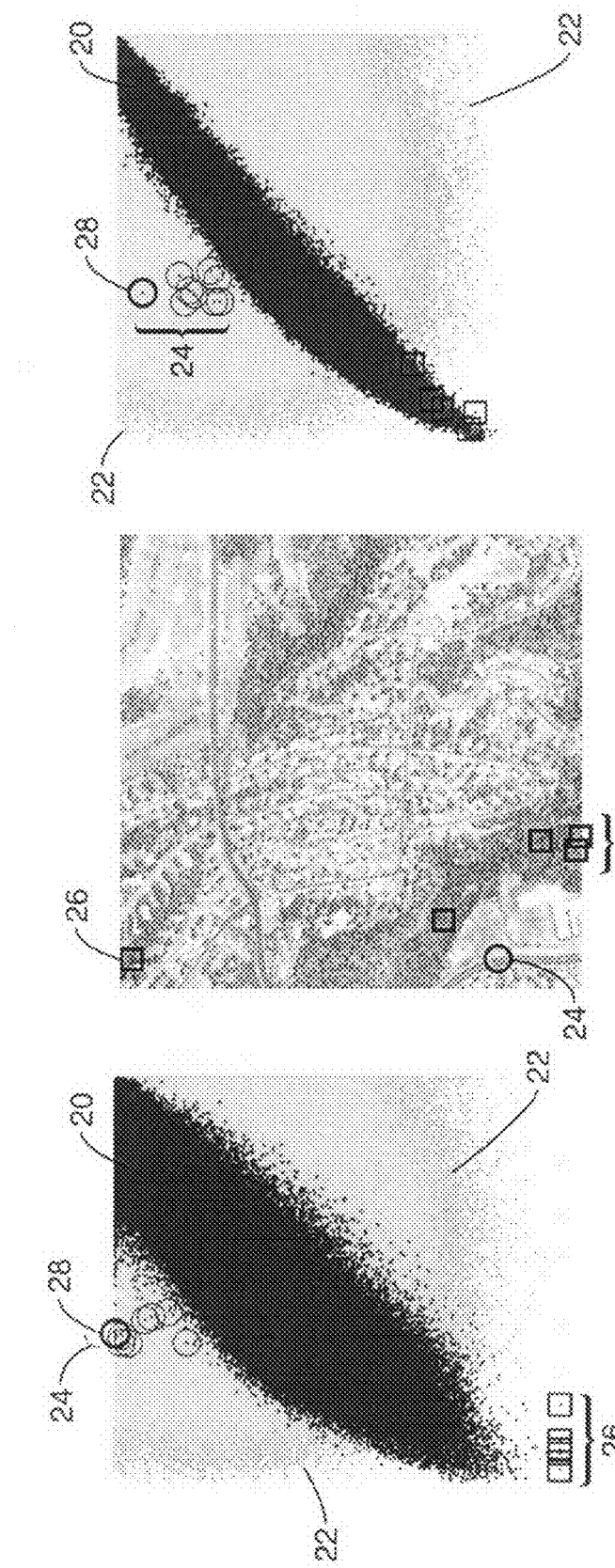
FIG. 2 illustrates the resampling approach in accordance with the present invention as applied to the Images in FIG. 1.

Smoothing is just one example of a spatio-spectral operator that can be applied to modify imagery. To the extent that these global operators (by global, we refer to the application of the operator over the whole image) can lead to pairs of images that are more nearly identical, that is likely the improve the ability to identify small local anomalous changes. This effect is illustrated in FIG. 2(c). It is possible to have a scenario in which spatio-spectral operators are systematically applied to the images with the goal of producing images that are more nearly identical.

A practical difficulty that arises with star fields is that the statistics are dominated by the large dark areas between stars, which can bog down the numerics. But it is a problem in anomalous change detection framework because it is contours of the ratio of densities that produces the anomalous changes. The ratios of extremely dense regions can exhibit large dynamic range, even though these are the areas of least interest.

In conclusion, the new distribution-based framework for anomalous change detection of the present invention permits derivation of standard approaches, such as the chronochrome, to generalize them to non-Gaussian situations, and to introduce new algorithms.

Spectral ("chromatic") issues were emphasized over spatial issues, but the importance in imagery of taking into account not only coregistration and ground sample distances issues, but spatial correlations, textures, and proximities, has been recognized.

Additional considerations include employing genetic programming to learn image processing pipelines that lead to good classifiers. A similar scheme can be used to optimize the choice of these spatial operators for pre-processing, to create better-matched images before the spectral anomaly detection step is invoked. Pixels are highly correlated, and associated with an arbitrary grid associated not with the scene, but with the geometry of the focal plane on the camera. Triangulating the image pairs into a common mesh of "trixels," which can be aggregated into larger polygons, provides a characterization that has more of an object-based flavor. One approach for dealing with small misregistrations in conventional change detection is to compare differences between a pixel in one image with each of the pixels in a small neighborhood of the corresponding pixel in the other image. The appropriate generalization of this idea to the distribution-based approaches would employ multiple-instance learning. Use of kernels for anomaly detection to anomalous change detection is also contemplated. Sometimes there are interesting anomalies that are not that rare. Rather than simply rank all pixels on a scalar value of anomalousness, it may also be productive to cluster the anomalies.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method for identifying pixels in co-registered first and second images that correspond to anomalous changes within the images, comprising:
   selecting said first and second images for comparison;
   writing sample (x,y) pairs to represent a pixel at a specified location in the first and second image;
   wherein x represents the pixel from the first image, and y represents the corresponding pixel from the second image;
   estimating P(x);
   wherein P(x) comprises the distribution of pixels in the first image;
   estimating P(y);
   wherein P(y) comprises the distribution of pixels in the second image;
   estimating P(x,y);
   wherein P(x,y) comprises the distribution of (x,y) values in the first and second images; and
   computing for every (x,y) pair the ratio of f(x,y)=P(x,y)/[P(x)P(y)].

2. A method as recited in claim 1, further comprising:
   selecting as anomalous changes the pixels (x,y) for which f(x,y) is smaller than a predetermined threshold.

3. A method as recited in claim 2, wherein at least one of P(x) and P(y) are non-uniform distributions.

4. A method as recited in claim 3, wherein $$P(x) = \int P(x, y) dy$$

and P(y) is a constant,
wherein P(y) corresponds to a uniform background.

5. A method as recited in claim 2, wherein both P(x) and P(y) are non-uniform distributions.

6. A method as recited in claim 5, wherein $$P(x) = \int P(x, y) dy \text{ and } P(y) = \int P(x, y) dx.$$

7. A method as recited in claim 2, further comprising directly modeling f(x,y).

8. A method as recited in claim 7, wherein directly modeling f(x,y) comprises assuming P(x,y), P(x), and P(y) are Gaussian distributions.

9. A method as recited in claim 8, further comprising:
   computing the quadratic function $$[x^2 \ y^2] K \begin{pmatrix} x \\ y \end{pmatrix};$$

wherein the matrix K is given by $$K = \begin{pmatrix} X & C^T \\ C & Y \end{pmatrix}^{-1} - \begin{pmatrix} X & 0 \\ 0 & Y \end{pmatrix}^{-1}.$$

10. A method for identifying anomalous changes in co-registered first and second images, comprising:
    selecting said first and second images for comparison;
    writing sample (x,y) pair to represent a pixel at a specified location in the first and second image;
    wherein x represents the pixel from the first image, and y represents the corresponding pixel from the second image;
    generating a new image pair (X',Y') by scrambling the pixels in the first and second images;
    generating a normal set of (x,y) points in the original image and a background set of (x,y') points obtained from the scrambled image pair; and
    computing f(x,y) by distinguishing the normal set from the background set through binary classification.

11. A method as recited in claim 10, further comprising:
    selecting as anomalous changes the pixels (x,y) for which f(x,y) is smaller than a predetermined threshold.

12. A method as recited in claim 11, further comprising:
    assigning parameters to the normal and background datasets set to classify the data.

13. A method as recited in claim 12, further comprising:
    assigning a greater weight on the normal dataset than the background dataset.

14. A method as recited in claim 10, wherein f(x,y) is computed with a binary classification scheme.

15. A method for identifying anomalous changes in co-registered first and second images, comprising:
- selecting said first and second images for comparison;
- writing sample (x,y) pair to represent a pixel at a specified location in the first and second image;
- wherein x represents the pixel from the first image, and y represents the corresponding pixel from the second image;
- estimating the distribution of pixels in the first image;
- estimating the distribution of pixels in the second image;
- estimating the distribution of (x,y) values in the first and second images; and
- computing for every (x,y) pair the ratio of the distribution of (x,y) values in the first and second images divided by the product of the distribution of pixels in the first image and the distribution of pixels in the second image.

16. A method as recited in claim 15, further comprising:
- assigning a threshold value to the computed data; and
- selecting as anomalous changes the pixels (x,y) for which f(x,y) is smaller than the assigned threshold.

17. A method as recited in claim 15, wherein at least one of the distribution of pixels in the first image and distribution of pixels in the second image are non-uniform distributions.

18. A method as recited in claim 15, wherein both the distribution of pixels in the first image and distribution of pixels in the second image are non-uniform distributions.

19. A method as recited in claim 15, wherein at least one of distribution of pixels in the first image, the distribution of pixels in the second image and the distribution of (x,y) values in the first and second images are estimated as Gaussian distributions.

20. A method as recited in claim 19, wherein the distribution of pixels in the first image, the distribution of pixels in the second image and the distribution of (x,y) values in the first and second images are estimated as Gaussian distributions.

21. A method as recited in claim 15:
- wherein the distribution of pixels in the first image comprises $$P(x) = \int P(x, y) dy;$$

and
- wherein distribution of pixels in the second image comprises $$P(y) = \int (x, y) dx.$$

22. A method as recited in claim 15:
- wherein the distribution of pixels in the first image comprises $$P(x) = \int P(x, y) dy;$$

and wherein distribution of pixels in the second image comprises a constant, uniform distribution.

23. A system for identifying anomalous changes in first and second images, comprising:
- a first set of image data;
- a second set of image data;
- said first and second image data sets having sample (x,y) pairs representing a pixel at a specified location in the first and second image;
- wherein x represents the pixel from the first image, and y represents the corresponding pixel from the second image;
- means for computing a relationship between data in the first set and data in the second set based on a non-uniform distribution of data in the first set of image data and second set of image data; and
- means for selecting data from the computed relationship falling within a threshold value as an anomalous change.

24. A system as recited in claim 23, wherein the means for computing the relationship is configured to generate a new image data set by scrambling the pixels in the original data set of the first and second images, and distinguish the scrambled data set from the original data set with a binary classification scheme.

25. A system as recited in claim 23, wherein the means for computing the relationship is configured to estimate the distribution of pixels and (x,y) values in the first and second images and calculate a ratio of the distribution of (x,y) values in the first and second images divided by the product of the distribution of pixels in the first image and the distribution of pixels in the second image.

* * * * *